April 25, 1933.                J. R. COFFMAN                1,905,684
                              VALVE STRUCTURE
                          Filed March 18, 1930           2 Sheets-Sheet 1

INVENTOR.
John R. Coffman.
BY
ATTORNEY

April 25, 1933.  J. R. COFFMAN  1,905,684
VALVE STRUCTURE
Filed March 18, 1930  2 Sheets-Sheet 2
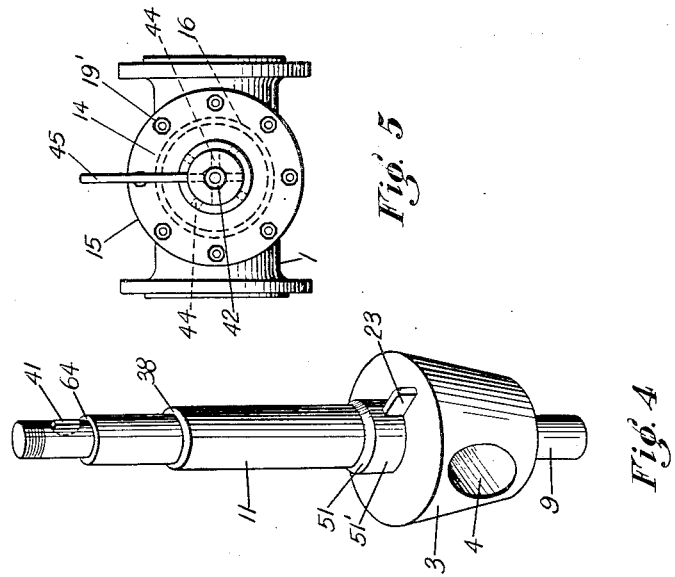
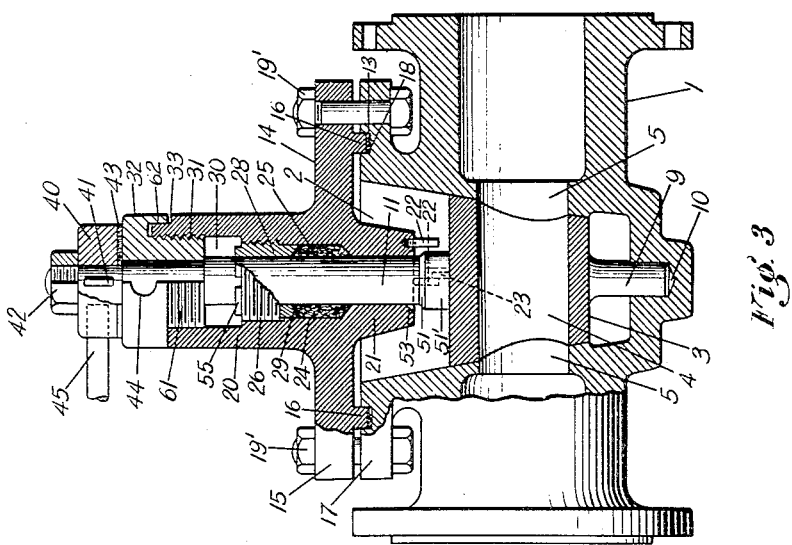
INVENTOR.
John R. Coffman.
BY
ATTORNEY Patented Apr. 25, 1933

1,905,684

UNITED STATES PATENT OFFICE

JOHN R. COFFMAN, OF COLUMBUS, OHIO, ASSIGNOR TO THE COLUMBUS VALVE MANUFACTURING CORPORATION, OF COLUMBUS, OHIO, A CORPORATION OF OHIO

VALVE STRUCTURE

Application filed March 18, 1930. Serial No. 436,813.

My invention relates to value structure. It pertains, more particularly, to a valve for high pressure and temperature operation embodying a novel means for raising and lowering and rotating the valve plug with relation to its seat. This valve is adapted to be used in connection with gas, oil and steam lines wherein the pressure is normally maintained at about two thousand pounds per square inch or, in lines that have a varying pressure of between five hundred and two thousand pounds per square inch.

In the past, much difficulty has been experienced in providing a valve plug that could be easily "broken out" from its seat, withdrawn therefrom to the proper degree of clearance, and then rotated to open or closed position without causing the valve plug to move longitudinally in its seat. As the result of this longitudinal movement, during rotation, the normal clearance between the valve plug and the valve seat would be increased to such an extent that large particles of dirt, rust and other extraneous material were admitted to the valve chamber where such material would lodge between the machined surfaces of the parts enclosed therein and preclude subsequent efficient seating of the plug. This disadvantageous feature arises from the fact that the valve plug in prior art structures, as a rule, was equipped with a threaded valve stem. When the stem was rotated to move the valve from open to closed position, or vice versa, the stem would feed longitudinally through its carrier thus moving the plug upwardly still further to materially increase the normal clearance between the plug and its seat, it being understood of course, that the plug was first "broken out" from its seat and raised to the proper degree of clearance.

Furthermore, the operating parts of the valve, with the exception of those disposed in the valve chamber, were not provided with positive and adequate means of lubrication. In fact, the majority of the operating parts such as the threaded valve stem and the means for raising and lowering the plug, were entirely exposed to the atmosphere and, in the absence of proper lubrication coupled with continued exposure to the elements soon became rusted and hard to operate.

One object of my invention consists in the provision of a valve structure for high temperature and pressure operation that can be produced at a relatively low cost, and that will embody such features that it may be easily and conveniently operated and readily disassembled for purposes of repair.

Another object of my invention lies in the provision of a valve that may be easily operated, at all times, to positively wedge the plug in its seat, locked against operation, in either its open or closed position.

Still another object of my invention is to provide a valve for high pressure and temperature operation, wherein the plug may be easily unseated and moved to the proper clearance and then rotated from one position to the other without increasing the normal clearance between the valve and plug.

A still further object of my invention is to provide a valve structure for high temperature and pressure operations wherein the operating parts thereof are fully enclosed and protected from dirt and dust and furthermore are adequately and positively lubricated.

A still further object of my invention is to provide a valve structure that is operated by means of a single removable lever or key, thus obviating the necessity for having a plurality of operating wheels and levers, and furthermore tending to discourage unwarranted tampering with the valve by the removal of a visible means for control.

My invention preferably embodies a valve plug that is provided with an integral valve stem having a collar keyed on the upper end thereof. This collar is provided with the proper openings for the reception of a removable operating lever, by means of which the stem and plug are rotated. A raising and seating nut operated by the same removable lever is disposed directly below the collar, being threaded internally into the vertical sleeve of the bonnet, and being mounted in concentric relation to the stem, so that it may impart longitudinal movement thereto through the medium of the collar. The lower end of this raising and seating nut abuts a shoulder formed on the valve stem. Reciprocation of the raising and seating nut in one direction will cause it to bear against the shoulder on the stem, and continued rotation thereof will cause the plug to be wedged securely against its seats. Rotation of the raising and seating nut in the opposing direction will cause it to travel upwardly and bear against the under side of the collar to move the stem upwardly thus removing the plug from the seat. It will be apparent that the plug may be rotated independent of the means for reciprocating the stem longitudinally and further without longitudinal movement during rotation, it being obvious that when the plug is finally wedged in position it will be immovable until it has been slightly loosened.

Furthermore, the vertical sleeve of the bonnet is interiorly enlarged to form a reservoir for the reception of a lubricant.

The preferred embodiment of my invention is shown in the accompanying drawings wherein similar characters of reference designate corresponding parts and wherein:

Figure 3 is a longitudinal sectional view similar to Figures 1 and 2, showing the plug in open position and wedged into the valve seat.

Figure 4 is a perspective view of the valve plug and stem.

Figure 5 is a plan view of the preferred embodiment of my valve structure, showing the operating lever mounted in cooperation with one of the collars disposed on the valve stem.

Figure 2:
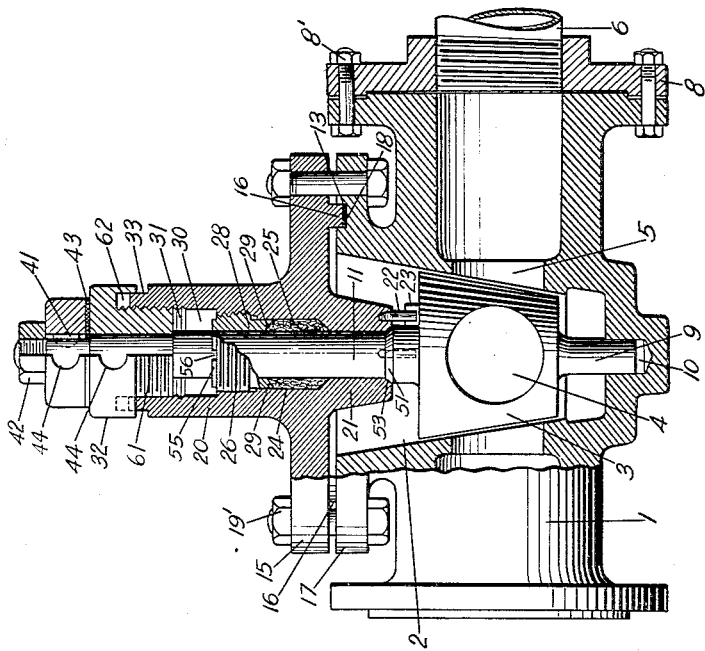
Figure 2 is a longitudinal sectional view similar to that of Figure 1, showing the plug of my valve structure raised from its seat preparatory to rotation from closed to open position.
Figure 1:
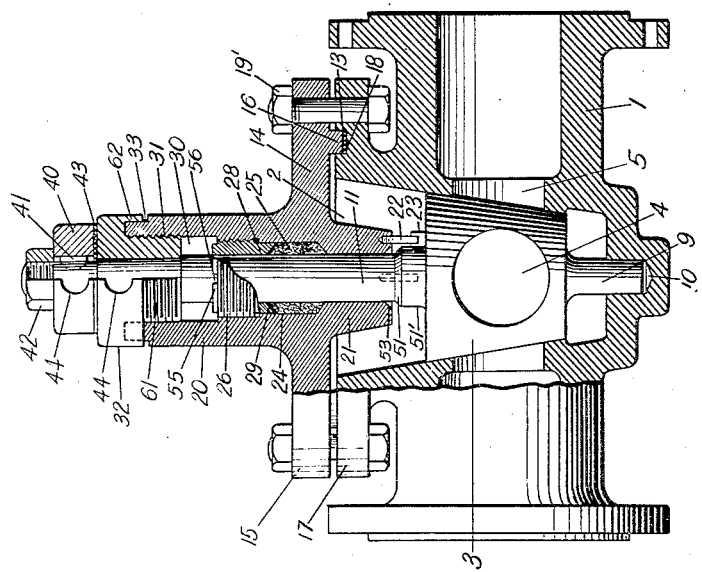
Figure 1 is a longitudinal sectional view of the preferred embodiment of my valve structure showing the plug thereof wedged in closed position.

With reference to the drawings, I have shown in Figures 1, 2 and 3 the preferred embodiment of my valve structure as comprising a body portion, or casing 1, that is preferably forged from a billet of suitable metal. This casing is provided with a vertical tapering bore 2 circular in cross-section, that is adapted to form an inverted conical valve chamber for the reception of a tapering valve plug 3.

This valve plug 3 is equipped with a horizontal cross bore 4, Figure 3, that is so disposed therein that proper rotation of the valve plug will bring it into alignment with the horizontal longitudinal bore 5 formed in the casing 1. The cooperation of these two bores will permit the flow of fluid through the valve, the fluid being conducted thereto by the pipes 6. Each pipe is equipped with a flanged coupling as at 8, that is adapted to cooperate with the flanged end of the casing 1, and is bolted thereto as at 8'.

The plug 3 is further equipped with cylindrical depending guide post 9, that is adapted to be disposed in the vertical bore 10 that is formed in the casing 1 at the lower end of the vertical tapering bore 2. The cooperation of the guide 9 and the vertical bore 10 is for the purpose of maintaining the plug 3 in proper alignment with the bore 2 to allow positive engagement of their respective contacting surfaces during reciprocation therein.

The valve plug 3, Figure 4, is also equipped with an upstanding cylindrical valve stem 11. This stem is formed integrally with the upper surface of the plug and has an enlarged base, Figure 4, as at 51', that is beveled as at 51 to cooperate with the flared cut away portion 53 formed in the lower end of the sleeve 21 carried by the bonnet 14, as will be hereinafter referred to more in detail. The valve stem 11 serves as a means whereby the valve plug 3 may be raised and lowered, and rotated in the bore 2. When the plug is mounted in the casing 1, the stem is adapted to be enclosed, except for a short section adjacent its uppermost limits, by a vertical sleeve 20 formed as a part of the bonnet member 14, that is rigidly bolted to the casing 1 in such position as to overlie the bore 2. The stem 11 lies in a vertical bore therein that will be hereinafter mentioned.

Referring to Figure 5, it will be noted that the bonnet member is provided with a flange 15, that is adapted to be mounted on and bolted to a substantially horizontal surface 17, encircling the upper end of the bore 2, and formed as a part of the casing 1. In order to secure a leak proof connection between these two surfaces I have placed a groove 18 in the upper surface of the portion 17 that encircles the bore 2 and is adapted to receive a tongue 16 that is formed as a part of and depends from the under surface of the flange 15. Prior to the insertion of the tongue in the groove, I place a circular gasket 13 of any suitable material, therein. Thus when the stud bolts 19', that are arranged adjacent the periphery of the flange 15 and surface 17, are drawn tight, the tongue will be securely seated in the groove to preclude the escape of fluid from the valve chamber past this point.

As hereinbefore mentioned, the flange 15 has a centrally disposed depending integral sleeve 21 through which the vertical bore in the bonnet extends. This bore is in alignment with the bore 10 at the lower end of the bore 2 and is somewhat reduced in diameter for substantially its entire length. The valve stem is adapted to lie in intimate contact with the wall in this reduced portion although the stem and wall are not in such close contact as to preclude efficient reciprocation or rotation of the stem. The bearing thus formed for the valve stem serves to hold it in proper upright position, and when the stem is lifted prior to rotation of the plug, the upper beveled edge 51 of the enlarged base 51' will seat in the outwardly flared portion 53 formed in the lower end of the sleeve 21 to allow easy rotation of the plug without an undue amount of friction between these parts.

The lower end of the sleeve 21 is further provided with the two depending stop pins 22 that are threaded thereinto as shown. These stop pins are adapted to cooperate with an upstanding member 23 mounted on the upper face of the plug 2, and are so arranged that one of the pins will contact with the upstanding member at the instant the plug reaches open or closed position, thus precluding further rotation of the plug past either of these positions. The advantage of such means is apparent in that the operator of the valve will be immediately apprised of the position of the valve when such resistance to further rotation thereof is set up.

As hereinbefore mentioned, the valve stem 11 extends into and through a vertical bore in the sleeve 20 of the bonnet member 14. This bore is somewhat enlarged in diameter directly above the extension 21, as at 24, and is preferably provided for the reception of packing material 25 that lies intermediate the stem 11 and the wall of the bore. A packing gland nut 26 is threaded internally into the upper end of this bore and is provided with an integral depending follower 28 that extends below the threaded surface thereof and is adapted to press downwardly on the packing material to wedge it in place. This nut 26 is also bored centrally to allow the stem 11 to extend therethrough. The lower end of this follower has been beveled as at 29, in opposition to the beveled wall of the enlarged bore 24, for a purpose that is readily apparent.

The upper surface of the gland nut 26 is provided with an annular raised ridge 55 having a plurality of opposite notches 56 cut transversely across the face thereof. This ridge and the notches therein are adapted to cooperate with a tool, not shown, by means of which the nut is screwed into and out of place. Furthermore, the upper surface of this gland nut forms the lower wall or base of a lubricant reservoir.

The vertical bore in the sleeve 20 is still further enlarged in diameter, as at 30, directly above the bore 24. It is this section of the bore that I preferably intend to utilize as a lubricant reservoir. The interior wall of this bore, adjacent the upper end thereof is threaded as at 31 for the reception of the threaded shank 61 of a raising and seating nut 32 that is bored centrally to allow the stem to extend therethrough. The term raising and seating as applied to this nut is descriptive of its function which is to raise the stem and lower it, as will be hereinafter described.

This nut preferably comprises a shank portion 61 that is threaded into the bore 30, as hereinbefore mentioned, and has a cap section 62 formed integrally therewith that is grooved as at 33 to allow the nut to straddle the upper end of the sleeve when screwed downwardly thereon thus serving to preclude dust and dirt from entering the reservoir. The shank 61 is of sufficient thickness to contact with both the valve stem 11 and the wall of the bore to completely fill the space therebetween. It is desirous that these parts intimately contact to preclude the escape of lubricant therearound. The lower end of this shank 61 is adapted to abut against a shoulder 38 formed on the stem 11 by reducing the diameter thereof. Rotation of the nut 32, in one direction, will serve to move the shank 61 downwardly thus bringing force to bear against the shoulder 38 of the stem 11 so as to move it longitudinally to wedge the plug in the bore 2.

Mounted on the stem 11 directly above the raising and seating nut 32 is a thrust collar 40 by means of which the plug is rotated in its seat. This collar is keyed on the stem by means of the woodruff key 41. A nut 42, threaded on the upper extremity of the valve stem 11 is adapted to be screwed downwardly into engagement with the upper surface of the thrust collar 40 to aid in maintaining it in position on the stem by seating it firmly on a shoulder 64 formed on the stem 11. A thrust washer 43 is interposed intermediate the upper surface of the raising and seating nut 32 and the lower surface of the thrust collar 40.

Both the thrust collar 40 and the raising and seating nut 32 are provided with a plurality of radial openings 44. A lever 45, Figure 5, is adapted to be inserted in any one of these openings to effect rotation of either the raising and seating nut or the thrust collar.

It will be apparent that rotation of the raising and seating nut 32, in one direction, will serve to force it upwardly against the lower surface of the thrust collar 40 thus tending to move the plug upwardly and out of engagement with the tapering wall of the bore 2. It will also be apparent, that a lubricant may be placed in the bore 30 to insure positive lubrication of the raising and seating nut 32, and in addition, will serve to thoroughly lubricate a portion of the valve stem.

Before entering into a detailed description of the operation of my invention, I would like to point out that I have shown in the drawings three views of my valve structure that illustrate the various positions to which it may be adjusted. Figure 1 of the drawings shows the preferred form of my valve structure in what I term "closed position". In this position, the valve plug is firmly seated in the bore 2 and the opening 4 therein is out of alignment with the crossbore 5 thus precluding the flow of fluid therethrough.

With reference to Figure 2 of the drawings, I have shown the plug, still in closed position, but raised from intimate contact with the wall of the bore. The plug is elevated to this position prior to rotation thereof from closed to open position.

In Figure 3, I have shown the preferred embodiment of my valve structure in open position wherein the plug 3 thereof has been rotated to bring the crossbore 4 thereof into alignment with the longitudinal bore 5 disposed in the casing 1. Furthermore, the plug 3 has been wedged into the bore 2 and is held immovably therein.

In the operation of my device, with particular reference to Figure 1, it will be noted that the valve plug is shown in closed position, wherein the exterior surface thereof intimately contacts with the wall of the bore 2. When it is desired to rotate the valve plug from closed to open position, the plug is first elevated or raised to the position shown in Figure 2.

In order to do this, I insert the tool 45 in one of the openings 44 in the raising and seating nut 32. I am thus enabled to rotate the raising and seating nut 32 in a counter clock-wise direction which will cause the raising and seating nut to move upwardly through its threaded engagement with the upper end of the sleeve 20. This movement will force the thrust collar 40 upwardly so as to move the valve stem longitudinally thus unseating the plug 3 and raising it to the position shown in Figure 2. At this time, the valve plug should have been withdrawn from intimate contact with the wall of the bore to such a degree that the clearance there between will be ample to allow rotation of the valve plug but yet will not be great enough to allow large particles of dirt, rust and other extraneous material to enter the valve chamber.

To bring the plug into a position, such as that shown in Figure 3, wherein the crossbore 4 is brought into alignment with the longitudinal bore 5, I remove the tool 45 from the raising and seating nut 32 and insert it in one of the openings 44 in the thrust collar 40. In this manner, I can rotate the thrust collar, valve stem and plug and change the plug from closed to open position, it being remembered that the plug is still in the raised position shown in Figure 2, during this operation.

To again lower the plug, the tool 45 is reinserted in one of the openings 44 in the raising and seating nut 32 and by rotating this nut in a clockwise direction, the lower end of the shank 35 thereof which is in engagement with the shoulder 38, tends to force downwardly there against to resultantly force the plug downwardly into wedging engagement with the bore 2.

In addition, it will be remembered that rotation of the valve plug 3 is limited by the stop pins 22 and the upstanding member 23 formed on the upper surface of the valve plug 3. Thus it can readily be seen that the plug can only be rotated through a quarter turn.

It is a feature of this invention, that I have provided a valve structure having an oil reservoir formed as an integral part thereof for insuring a positive and adequate supply of lubricant to the operating parts thereof. The shank of the raising and seating nut 32 will operate within the reservoir itself and will be assured of positive lubrication.

As another feature of this invention, the operating parts are fully protected from the atmosphere and they may be exposed for long periods of time thereto without danger of rusting and corroding. By providing a valve structure that is adequately protected from the elements and thoroughly lubricated I have insured ease of operation and long life therefor that has heretofore been one of the draw backs of valve structures of this type.

I do not wish to limit the provision of such an oil reservoir to a valve structure of this type, it being obvious that it may be utilized with valve stems having a threaded shank as in some of the prior art structures. Furthermore, I do not wish to limit the plug 3 and vertical bore 2 to the exact structure shown, it being obvious that the plug may be inverted, and likewise the bore to form a valve structure that would operate in substantially the same manner as my preferred structure with the exception that these two elements would assume a different position.

Having thus described my invention, what I claim is:

1. In a valve structure, a valve casing including a seat, a plug adapted to be disposed in said seat, a stem for said plug, a cap member for said casing having a tubular extension, a packing material in the lower portion of said extension and surrounding said stem, a gland member disposed within said tubular extension for compressing said packing material, and a nut mounted upon the upper end of said tubular extension and slidably mounted on said stem for moving the stem axially, there being a space between said nut and said gland member so as to provide a reservoir for lubricant, said nut and said gland member operating independently of each other.

2. In a valve structure, a valve casing including a tapering seat, a tapering plug disposed in cooperative relation with said seat, a stem for said plug, a cap member for said casing having a tubular extension which encloses said stem, a packing material in the lower portion of said extension and surrounding said stem, a gland member threaded within said tubular extension for compressing said packing material, and a nut mounted upon the upper end of said tubular extension for moving the stem axially, there being a space between said nut and said gland member so as to provide a reservoir for lubricant.

3. In a valve structure, a valve casing including a tapering seat, a tapering plug disposed in cooperative relation with said seat, a stem for said plug, a cap member for said casing having a tubular extension which encloses said stem, a packing material in the lower portion of said extension and surrounding said stem, a gland member threaded within said tubular extension for compressing said packing material, a nut mounted upon the upper end of said tubular extension for moving the stem axially, there being a space between said nut and said gland member so as to provide a reservoir for lubricant and a thrust member mounted upon the stem above said plug for rotating the plug in its seat.

4. In a valve structure, a valve casing including a seat, a plug adapted to be disposed in said seat, a stem having an enlarged base provided with a beveled edge about the upper portion of said base for said plug, a cap member for said casing having a tubular extension which is flared at its lower end and which encloses the stem of the enlarged base, the flared end of said tubular extension engaging the beveled edge of the enlarged base of said stem when said enlarged base is moved into engagement therewith, a packing material in the lower portion of said extension and surrounding said stem, a gland member threaded within said tubular extension for compressing said packing material, and a nut mounted upon the upper end of said tubular extension for moving the stem axially, there being a space between said nut and said gland member so as to provide a reservoir for lubricant.

5. In a valve structure, a valve casing including a seat, a plug adapted to be disposed in said seat, a stem having an enlarged base provided with a beveled edge about the upper portion of said base for said plug, a cap member for said casing having a tubular extension which is flared at its lower end and which encloses the stem of the enlarged base, the flared end of said tubular extension engaging the beveled edge of the enlarged base of said stem when said enlarged base is moved into engagement therewith, a packing material in the lower portion of said extension and surrounding said stem, a gland member threaded within said tubular extension for compressing said packing material, a nut mounted upon the upper end of said tubular extension for moving the stem axially, there being a space between said nut and said gland member so as to provide a reservoir for lubricant, and a thrust member mounted upon the stem above said nut for rotating the plug in its seat.

6. In a valve structure, a valve casing including a seat, a plug disposed for cooperation with said seat, a stem for said plug, spaced abutments on said stem, a cap member for said casing, said cap member having a tubular extension through which said stem extends, a nut slidably mounted on said stem between said spaced abutments, said nut being threaded into the upper end of said tubular extension and adjustable into operative contact with either of said spaced abutments for raising or lowering said plug, a skirt depending from said nut and embracing the upper end of said tubular extension, a packing material in the lower portion of said extension and surrounding said stem, a gland member for compressing said packing material, and a reservoir for lubricant formed between said raising and seating nut and said gland member in said tubular extension.

7. In a valve structure, a valve casing including a tapering seat, a tapering plug disposed in cooperative relation with said seat, a stem for said plug and extending upwardly therefrom, an abutment formed on said stem, a thrust member mounted adjacent the upper end of said stem, a cap member for said casing, said cap member having a tubular extension through which said stem extends, a nut slidably mounted on said stem between said thrust member and said abutment, said nut being threaded into the upper end of said tubular extension and adjustable into operative contact with either said thrust member or said abutment for raising or lowering said plug, a skirt depending from said nut and embracing the upper end of said tubular extension, a packing material in the lower portion of said extension and surrounding said stem, a gland member threaded into said tubular extension for compressing said packing material, a reservoir for lubricant formed between said raising and seating nut and said gland member in said tubular extension, and a stem depending from the lower end of said plug, the lower end of said stem being adapted to rotatably fit within a socket formed in the lower portion of said casing.

8. In a valve structure, a valve casing including a tapering seat, a tapering plug disposed in cooperative relation with said seat, a stem having an enlarged base provided with a beveled edge about the upper portion of said base and extending upwardly from said plug, a cap member for said casing having a tubular extension through which said stem extends, said tubular extension being flared at its lower end, the flared end of said tubular extension engaging the beveled edge of the enlarged base of said stem when said enlarged base is moved into engagement therewith, an abutment on said stem, a thrust member mounted adjacent the upper end of said stem, a nut slidably mounted on said stem between said thrust member and said abutment, said nut being threaded into the upper end of said tubular extension and adjustable into operative contact with either said thrust member or said abutment for raising or lowering said plug, a skirt depending from said nut and embracing the upper end of said tubular extension, a packing material in the lower portion of said extension and surrounding said stem, a gland member threaded into said tubular extension for compressing said packing material, a reservoir for lubricant formed between said raising and seating nut and said gland member in said tubular extension, and a stem depending from the lower end of said plug, the lower end of said stem being adapted to rotatably fit within a socket formed in the lower portion of said casing.

9. In a valve structure, a valve casing including a valve seat, a plug adapted to be disposed in said seat, a stem for said plug, a cap member for said casing having a tubular extension, a packing material in the lower portion of said tubular extension and surrounding said stem, a gland member disposed within said tubular member and adjustable therealong to various positions for compressing said packing material, and a nut mounted upon the upper end of said tubular extension and slidably mounted on said stem for moving the stem axially, there being a space between said nut and said gland member in said tubular housing, said nut being adapted to operate independently of said gland member, spaced abutments on said stem, said nut being adjustable into operative contact with either of said spaced abutments for moving the stem axially.

In testimony whereof I hereby affix my signature.

JOHN R. COFFMAN.